July 3, 1962 S. P. KINNEY 3,042,362
BUTTERFLY VALVE
Filed March 25, 1958 2 Sheets-Sheet 1

INVENTOR.
SELWYNE P. KINNEY.
BY
Christy, Parmelee & Strickland
ATTORNEYS.

July 3, 1962 S. P. KINNEY 3,042,362
BUTTERFLY VALVE

Filed March 25, 1958 2 Sheets-Sheet 2

INVENTOR.
SELWYNE P. KINNEY.
BY
Christy, Parmelee & Strickland
ATTORNEYS.

United States Patent Office 3,042,362
Patented July 3, 1962

3,042,362
BUTTERFLY VALVE
Selwyne P. Kinney, Crafton, Pa., assignor to S. P. Kinney Engineers, Inc., Carnegie, Pa., a corporation of Pennsylvania
Filed Mar. 25, 1958, Ser. No. 723,703
2 Claims. (Cl. 251—306)

This invention relates to butterfly valves and is for a valve of this kind having a rubber seat for the damper.

It has heretofore been proposed to use a rubber ring in the body of a butterfly against which the damper seats when the valve is closed. In a copending application Serial No. 551,011, filed December 5, 1955 by Corneilus J. Garrigan and me, since abandoned, there is disclosed a valve having a rubber seat which has been highly successful in various places, especially high pressure water mains, as well as elsewhere. The construction there shown is quite expensive and the sealing ring must be forced into place under hydraulic pressure.

The present invention has for a primary object to provide a valve with a rubber seal which is cheaper and easier to manufacture and assemble. A further object is to provide an improved sealing ring and an improved construction for retaining it in the valve body.

Figure 1:
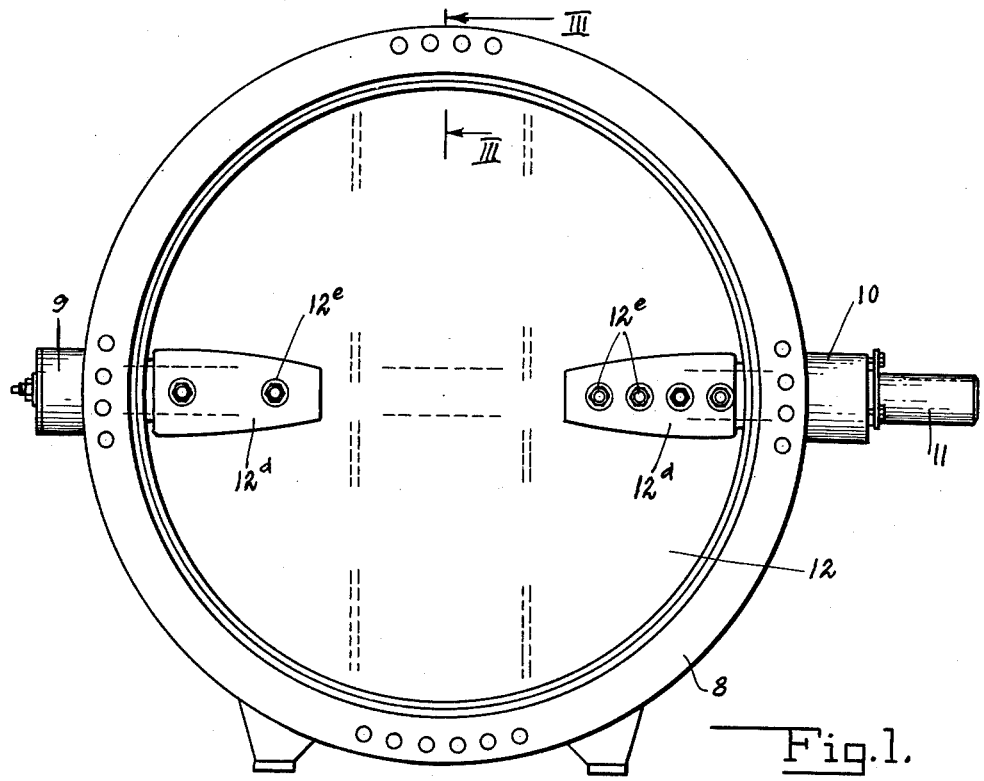
Figure 2:
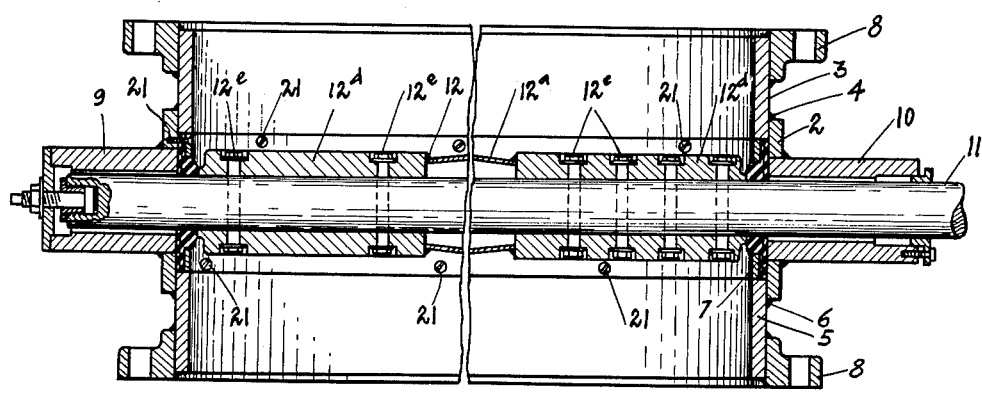
Figure 4:
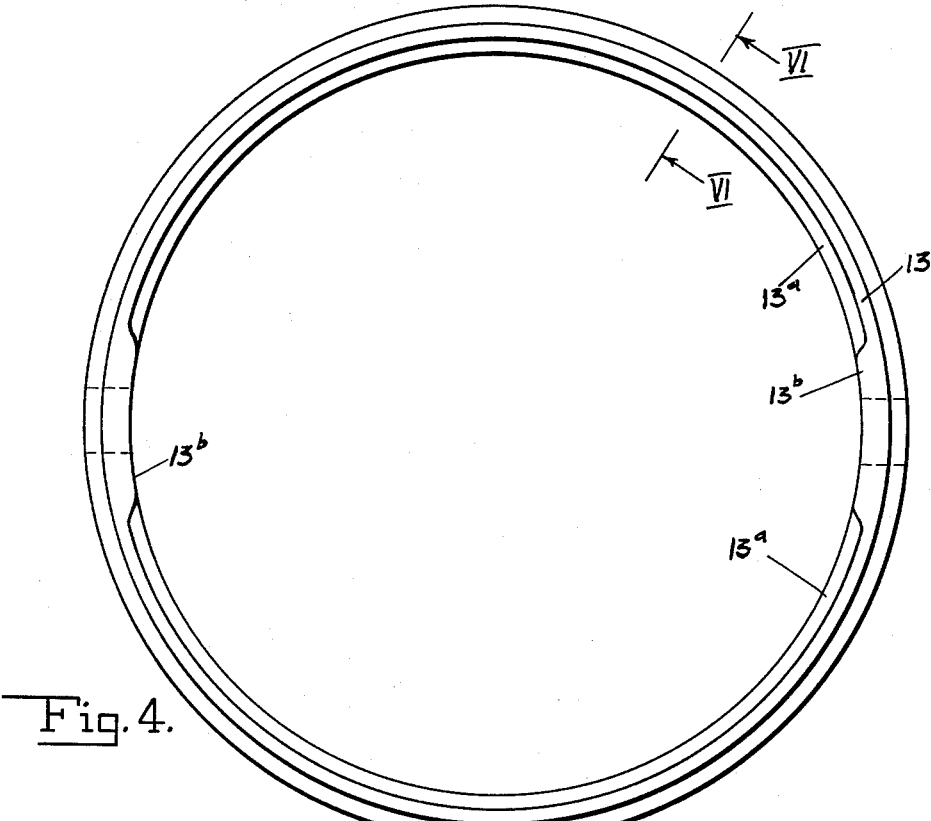
Figure 3:
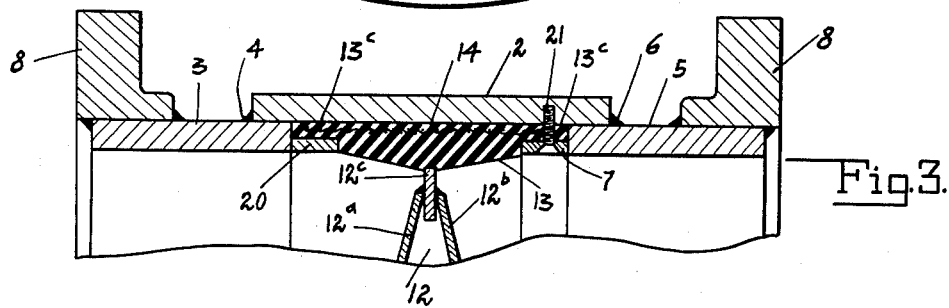
Figure 6:
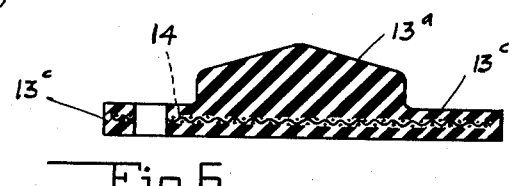
Figure 5:
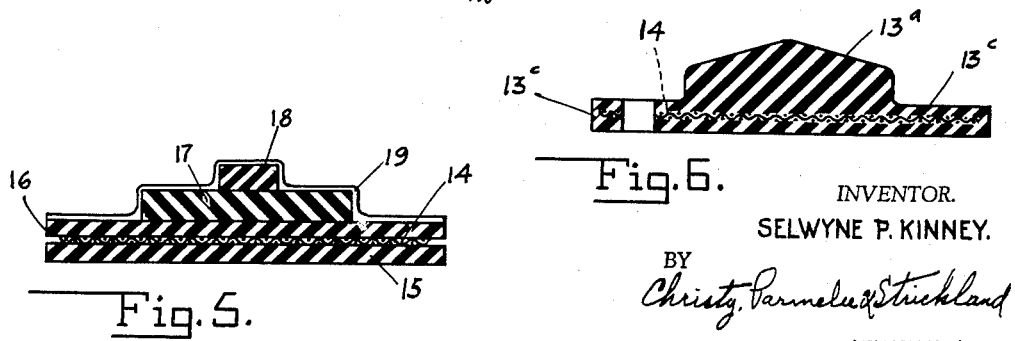

My invention may be fully understood by reference to the accompanying drawings, in which:

FIG. 1 is an end view of the valve;
FIG. 2 is a transverse section in the plane of line II—II of FIG. 1, but on a larger scale;
FIG. 3 is a fragmentary transverse section in the plane of line III—III of FIG. 1;
FIG. 4 is an elevation of the sealing ring removed from the valve;
FIG. 5 is a transverse section showing the manner of assembling the sealing ring; and
FIG. 6 is a transverse section in the plane of line VI—VI of FIG. 4.

Referring to the drawings, the valve body is assembled primarily from five annuli welded together instead of being cast in the usual manner. There is a central annulus 2. An annulus 3 is telescoped into one end of the band or ring 2, having a close fit therein, and these two rings are welded together at 4. At the opposite end of the central annulus 2 is a third annulus or ring 5 similar to 3, telescoped into the ring 2, and these parts are welded at 6. The annuli 3 and 5 have their inner ends separated to provide with the central band 2 an annular recess 7 within the valve body. Welded to the outer end of each of the annuli 3 and 5 are bolt flanges 8.

The central ring or annulus 2 has diametrically-opposite openings therethrough in which are set bearing sleeves 9 and 10 respectively. There is a shaft 11 mounted in these sleeves and to which is secured a circular valve element or damper 12. This damper is conveniently formed of two confronting pressed metal outwardly convexed disks 12a and 12b having a protruding ring 12c welded between their principal edges as shown in FIG. 3. At diametrically opposite points the disks are cut away and sleeves 12d are welded into the cutouts. The damper shaft 11 passes through these sleeves 12c as shown in FIG. 2, and the bolts 12e passing transversely through the sleeves and shaft connect the damper to the shaft. There is thus formed a built-up valve body and circular valve disk or damper and the damper, by reason of the convex shape of the two disks from which it is constructed, is strong but of relatively light weight.

The annular recess 7 serves to receive a resilient sealing ring. This ring, designated generally as 13, has a circular exterior which is transversely flat to seat against the inner wall of the central annulus. The overall width of the sealing ring is such that it snugly fits the channel. On the inner surface it has a central ridge portion 13a that slopes from both sides toward the center where the ring is of maximum thickness, this sloping ridge extending around the entire inside of the ring except at the two places where the shaft passes through it where the surface of the ridge is a flat square around the shaft opening, these squares being designated 13b. Around each side of the central ridge the band has a lateral flange portion 13c of reduced thickness.

The band has a non-stretching reinforcing strip 14 extending around it and of substantially the full width of the band. It is preferably in the nature of coarse strong screen fabric such as hardware cloth. It is preferably embedded in the band at the level of the middle of the flanges so as to be also embedded in the flanges. Its width is such that the edges are just within the boundaries of the edges, so that the edges are not exposed.

The seating ring is preferably made, as shown in FIG. 5, by a base layer of rubber 15 over which is spread the hardware cloth 14 and another layer of rubber 16. Over this is placed a narrow strip 16 and a thick narrower central strip 18 over which is then placed a top sealing layer 19 the full width of the band. This assembly is made of uncured rubber, synthetic or natural, or combinations or mixtures thereof, and which will usually adhere when pressed together. The assembly is then vulcanized, and the rubber layers contacting through the coarse screen vulcanize to each other as well as to the metal. The resulting product has the form shown, and it is important that the two exposed layers are vulcanized together in the flange portions of the sealing ring, because the exposed edges of the laminations are protected from separating under pressure, as will be hereinafter described. After forming, the ring may be trimmed as necessary to provide the sloped ridge.

After the sealing ring is put into place in the recess in the valve body—and the sealing ring is sufficiently flexible so that it can be distorted to fit it into the recess—sectional narrow metal clamping rings 20 are put into place over the flange 13c and fastened into place by machine screws 21 that pass through the metal ring sections 20, the flanges 13c into the valve body, the inner face of the rings 20 being flush with the passageway through the valve body, and their outer edges abut against the sides of the recess.

It will be seen that the screws 21 pass through the wire screen reinforcement, which is an important feature. When the valve gate approaches the closed position where its edge ring 12c moves closer to the ridge, there is an increase in the velocity of flow of liquid through the valve tending to "wash" the rubber ring out of its channel. The same condition exists as the valve is opened. However, this cannot happen because the wire mesh reinforcement is put under tension, preventing the sealing ring from buckling and keeping the rubber from being torn where the screws pass through it. At the same time, the rubber, being vulcanized through the screen, distributes the tension from the wires immediately around the screws so that the screen is not over-stressed. Also, as the valve is forced to closed position, the edge of the damper "drags" with increasing force on the sealing ring, also tending to dislodge it from the recess, and these stresses are taken by the wire mesh and distributed so that the sealing ring cannot be pushed or moved by the pressure of the damper out of its recess.

Since the exposed laminations of the sealing ring are both confined under the retaining rings 20 and clamped by these rings against the valve body, fluid pressure cannot be effective to penetrate any imperfectly bonded crevice and separate one layer from another.

When the damper is moved toward closed position, its periphery clears the sealing ring until it approaches the full-closed position when it presses against the slope of the ridge depressing the rubber and making a tight seal. In the area of the shaft where the damper is always more nearly parallel to the sealing ring, the flat square areas 13b are provided, making the seal more effective in the area right around the shaft. The ends of the sleeves 12d press into these areas, and the endwise adjustment of the shaft, hereinafter explained, makes proper centering and sealing of the damper in the ring easily procurable.

At one end of the shaft on the outside of the bearing sleeve 9 there is closure plate 22. A thrust screw passing through this plate has its inner end swiveled in a socket in the end of the shaft 11, and by means of which the shaft may be adjusted endwise. Where the shaft extends through the end of the sleeve 10 to connect to an operating mechanism (not shown) there is a packing gland 24.

It will be understood that one form of valve body has been described fabricated from circular sections, but the sealing ring arrangement may be used in any valve body provided with an annular internal channel or recess to receive it, and other modifications and changes may be made.

I claim:

1. A butterfly valve comprising a body with a passageway therethrough, the body having an annular recess in the walls forming the passageway, a sealing band of rubberous material in the recess with a thick solid central portion and a thinner flange along each side, the central portion of the band projecting into the passageway through the body, a narrow metal band in the recess disposed on each side of the thick central part of the sealing band and overlying each flange, screws passing through the metal bands and through the flanges of the sealing band and screwed into the body, and a damper mounted to rotate in the body from an open to a closed position, the periphery of the damper in closed position contacting the thick central portion of the sealing ring, said sealing band being formed with a nonresilient coarse wire netting reinforcing band integrated therewith extending into each flange far enough so that said screws also pass through the netting, whereby said reinforcing band is put under tension by forces acting to dislodge the sealing band from the valve body.

2. A butterfly valve as defined in claim 1 in which the inner surface of the thick solid central part of the sealing band in section is a ridge with sloping sides except at two diametrically opposite places where it is flat, the damper being carried on a shaft that passes through such flat places with the parts of the damper through which the shaft passes pressing continuously against the said flat places, the outer periphery of the band with the flange being flat when viewed in transverse cross-section for contact with the confronting wall of the recess.

References Cited in the file of this patent

UNITED STATES PATENTS

| 1,951,283 | Kinzie | Mar. 13, 1934 |
| 1,977,351 | Phillips | Oct. 16, 1934 |
| 1,990,309 | Phillips | Feb. 5, 1935 |
| 2,608,203 | Butler | Aug. 26, 1952 |
| 2,912,218 | Stillwagon | Nov. 10, 1959 |

FOREIGN PATENTS

| 670,327 | Germany | of 1939 |
| 1,130,544 | France | of 1957 |